United States Patent [15] 3,702,464
Castrucci [45] Nov. 7, 1972

[54] INFORMATION CARD

[72] Inventor: Paul P. Castrucci, Poughkeepsie, N.Y.

[73] Assignee: International Business Machines Corporation, Armonk, N.Y.

[22] Filed: May 4, 1971

[21] Appl. No.: 140,174

[52] U.S. Cl..340/173 SP, 235/61.12 N, 235/61.12 C
[51] Int. Cl. ...G06k 19/00, G11c 11/36, G11c 17/00
[58] Field of Search....340/174 SP, 174 MA, 173 SP, 340/149 A; 235/61.12 R, 61.12 M, 61.12 C, 61.12 N; 307/303

[56] References Cited

UNITED STATES PATENTS

| | | | |
|---|---|---|---|
| 3,604,900 | 9/1971 | Kalt | 235/61.12 N |
| 3,245,051 | 4/1966 | Robb | 340/173 SP |
| 3,258,644 | 6/1966 | Rajchman | 340/174 MA |
| 3,548,254 | 12/1970 | Pahlavan | 340/174 MA |
| 3,637,994 | 1/1972 | Ellingboe | 235/61.12 N |

*Primary Examiner*—Stanley M. Urynowicz, Jr.
*Attorney*—Hanifin and Jancin and Henry Powers

[57] ABSTRACT

An information card for credit and accounting system having a monolithic or solid state memory for storage of information responsive to computer controlled systems.

1 Claim, 12 Drawing Figures

INVENTOR
PAUL P. CASTRUCCI
BY
ATTORNEY

PATENTED NOV 7 1972 3,702,464

SHEET 2 OF 4

INFORMATION CARD

FIELD OF THE INVENTION

This invention relates to information cards, and more particularly to an information card for use as credit cards, accounting cards and the like.

DESCRIPTION OF THE PRIOR ART

Information cards have found wide spread use in sales, bank and other varied transactions. Heretofore, information contained in these cards has been embodied in the form of embossments and incorporation of codeable magnetic material, as well as optically differential material, for purposes of encoding information as to the identity of the holder, and financial and business record of the holder. In conjunction with the use of such information cards (such as credit cards), various innovations have been advanced to facilitate further use of such cards and also to expedite control thereof for purposes of security and recordal of transactions associated therewith. Among the more significant developments associated with such information cards are systems utilizing computers for processing and control thereof, either on-site or via communication systems at a remote central processing station. Typical of such systems, utilizing conventional computer configurations, are those described in the following U.S. Pat. Nos.: 3,022,381, 3,245,697, 3,353,006 and 3,513,298.

SUMMARY OF THE INVENTION

It has been discovered in accordance with this invention that novel information cards, for use as credit, account cards, identity cards and the like, in computer controlled systems can be fabricated by incorporating elements of such systems within such cards for controllably entering information therein in response to such computer systems. Such information cards can be formed by incorporating therein monolithic or solid state memories such as employed in various computer configurations.

Broadly speaking, such monolithic memories comprise a matrix of solid state switches in a semiconductor chip, having an alterable state for placement of binary information therein in response to electrical activation. In one embodiment this memory may comprise a matrix of solid state monolithic back-to-back diode pairs wherein each pair of diodes represent a data point as disclosed in copending U.S. application Ser. No. 858,053 filed Sept. 15, 1969, now U.S. Pat. No. 3,641,516 and assigned to the assignee of this application. Such an information card would, as fabricated, contain a memory devoid of any information, i.e. all zeros. The card, on issue, could be inserted into a suitable terminal which would multiplex electrical signals to the proper matrix in the memory chip. The electrical energy arriving at the selected matrix position would alter the associated electrical elements (e.g. the back-to-back diode pair) in such a way as to produce a permanent change of electrical state, i.e. transforms zero into a one. In this fashion, one could electrically load information into the memory of the information card. Other matrixes of elements which could be adapted into the monolithic memories of the information cards of this invention, are those illustrated in U.S. Pat. No.

3,028,659, No. 3,191,151, No. 3,245,051 No. 3,384,879, No. 3,423,646 and No. 3,445,823.

The information cards of this invention are not only capable of containing information, but can also be used to manipulate data at a central data bank utilizing conventional computer communication systems as indicated above. For example, the credit rating of an individual could be transmitted from the central data bank through the terminal and result in additional information being placed in the card, which information could, as an illustration, code the card with the individual's credit risk. The credit risk would then be permanently recorded in the data card. Typically, if the data bank issued a poor credit risk, the information could be placed in the memory chip and void the credit card for any subsequent transactions. This same kind of process could be used in cancelling cards which were lost or stolen and give the individual holder ultimate security.

Credit cards which would have large monetary values or risks could be constructed with a personal security code. In this manner, in addition to standard credit and personal information, security code information could also be entered and stored in the monolithic memory of the card. In order to activate the card, one would insert it in a terminal and punch a matching security code via a keyboard entry of a selfcontained station or one in a conventional computer transmission system as for example, see U.S. Pat. No. 3,245,697. If the code data matched, the card would activate a central data bank and validate the transaction.

In another application, the information card of this invention could also be used as a form of modern travel check. In this application, an individual could purchase from a bank, a card which had a fixed monetary value, at which time the memory in the card would be loaded with the individual's personal and monetary data. As the individual utilized his card, the value of his purchases would be deducted from a central account, and the balance of the value remaining in his card would be updated electrically from the data bank. In this fashion, the individual could spend his card; with the value of his transactions automatically credited from the individual's account, at the central data bank, to the business establishment furnishing the purchased items or services to the individual.

Accordingly, it is an object of this invention to provide a novel information card, for use as a credit card, an account card and the like.

Another object of this invention is to provide a novel information card adapted for and compatible with data processing unit.

A further object of this invention is to provide a novel information card containing a monolithic or solid state memory adapted for communication with computer processing systems.

A still further object of this invention is to provide a novel information card with a monolithic memory having its information content responsive to computer controlled processing systems.

The foregoing and other objects, features and advantages of this invention will become more apparent from the following more particular description of the invention, in conjunction with the accompanying drawings.

DESCRIPTION OF THE PREFERRED EMBODIMENTS

Figure 1:
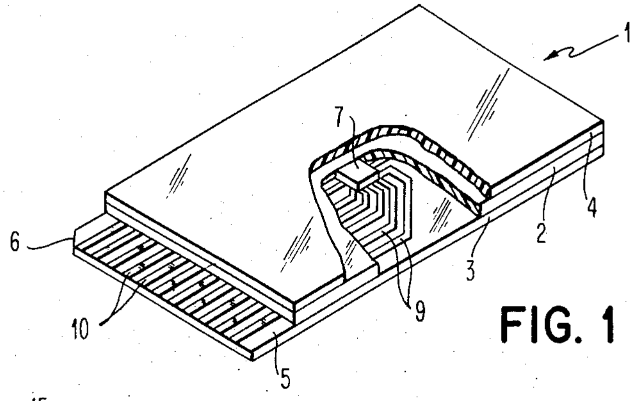
FIG. 1 is a perspective view of an embodiment of this invention having portions broken away to illustrate the interior construction of the embodiment.

As shown in the drawings, the information card 1 of this invention, as seen in FIG. 1, is a multilayer assembly of suitable sheet material such as plastic, wherein an inner layer 2 is interposed between outer or cover layers 3 and 4. Each of layers 2 and 4 are shown in coextension with each other, with cover layer 3 having an additional extension to form a tongue or tab portion 5. In one form the card 1 may be formed of a laminated array of suitably rigid plastic sheets, such as Mylar, whose physical dimensions are held in sufficiently close tolerance to facilitate insertion in a socket of a card reader in a computer system. To assist in the alignment of the card in the reader, one corner of the card 1, at the tab portion 5, may be bevelled as at 6. Embedded within card 1, is a monolithic or solid state memory 7, suitably formed in a semiconductor chip or substrate as more particularly described below, for insertion of personal and monetary data of the holder.

Optionally and although not required, the card may however be provided with supplemental information by suitable indicia on a face thereof indicating the account customer and issuing institution at which the card may be honored. The memory 7, contains a matrix of solid state electrical switching elements formed within a semiconductor substrate terminating in contacts 8 which are electrically connected within card 1, to a plurality of conductor strips 9 extending within the card with termination thereof at the exposed terminals 10 carried on the tab portion 5. These terminals 10 are mated with suitable contacts in the socket of a card reader to establish communication with a computer processing system.

Figure 5:
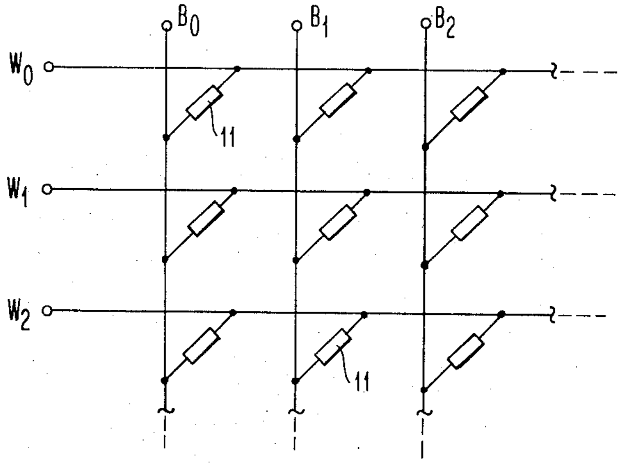
FIG. 5 is a schematic drawing of the monolithic or solid state memory comprehended for incorporation in the embodiment of FIG. 1 for storage of information therein.

In its broad aspect, the monolithic memory comprehended in this invention may be configured, as in FIG. 5, as a grid of crossed conductors $B_0$ - - - $B_n$ and $W_0$ - - - $W_n$, each electrically isolated from each other with bilateral solid state switching elements 11 positioned and cross-connected at the cross-over points, for activation of the elements to electrical passive and active states corresponding to the conventional binary coding system as more particularly described below. Information may be optionally stored in this manner by forming a matrix of active and inactive elements in a required manner.

The conductor strips 9 and terminals 10 in conjunction with cover layer 3 may conveniently constitute a printed circuit board which may be formed by conventional techniques from a conductor clad sheet of dielectric material, as for example, Mylar.

The opposite ends of the conductor strips 9 terminate at a contact area 12, of outer board 3 in a pattern for mating with contacts 8 of the monolithic memory chip 7.

Figures 2, 3, 4:
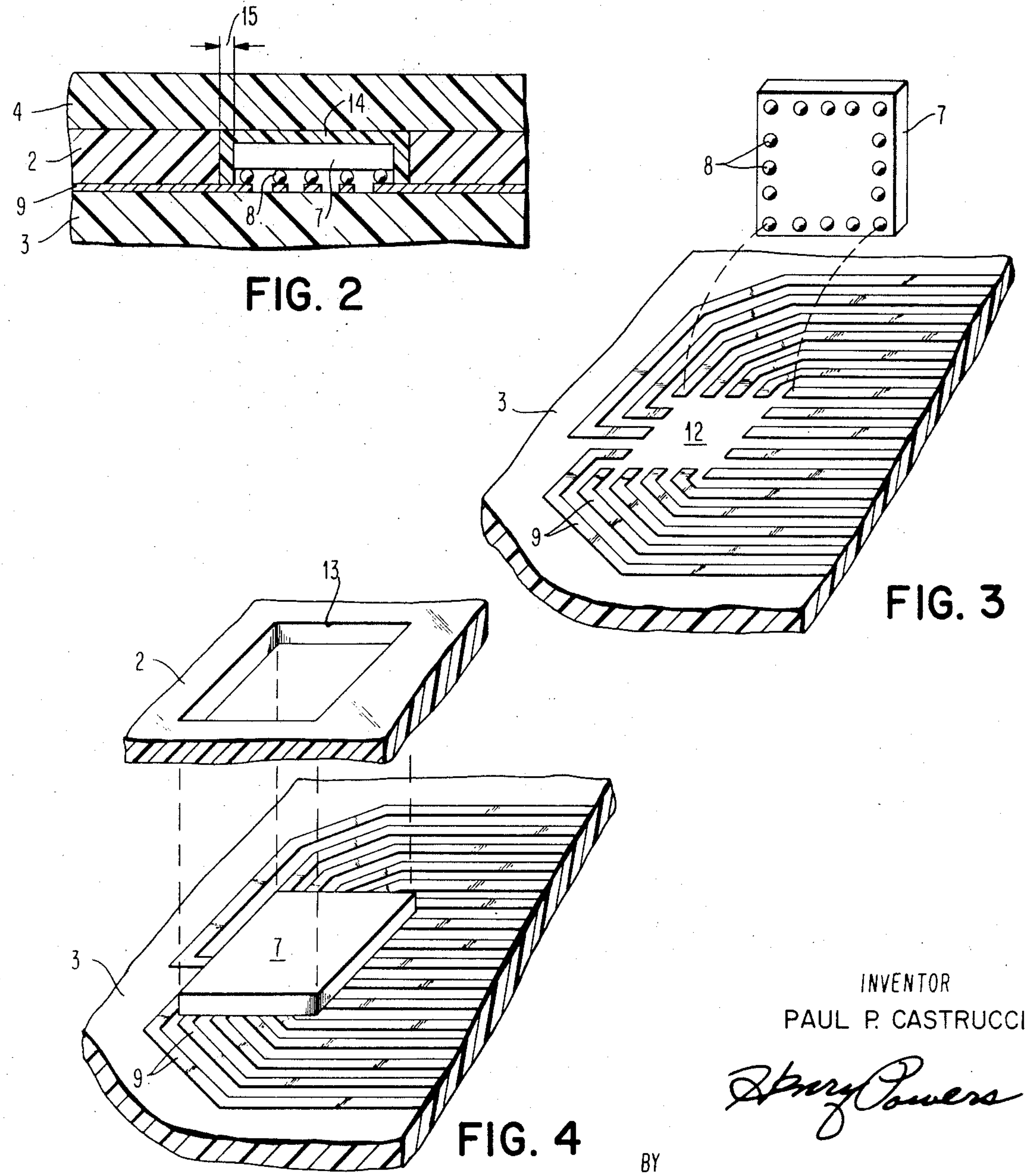
FIG. 2 is a fragmentary view of a portion of the embodiment of FIG. 1.
FIGS. 3 and 4 are fragmentary views illustrating details in the fabrication of the embodiment of FIG. 1.

For assembly of information card 7 the memory chip 7 may be superimposed as shown in FIG. 3, on the contact area 12 of cover sheet 3, for mating of contacts 8, of chip 7, with the corresponding portions of conductor strips 9, and appropriately secured hereto by any convenient manner as by solder-reflow of the contacts 8. After connection of chip 7 to the conductor strips 9 of cover sheet 3, the chip may be secured and safeguarded by means of a guard or inner sheet 2 which receives the chip within an aperture 13 dimensioned to encompass the chip which typically will have dimensions of 152 mil length × 152 mil width × 15 mil thickness. The inner and outer layers 2 and 3 may be suitably integrated in any conventional manner, as by adhesives. Further protection of memory chip 7 can be obtained by use of resilient potting material 14, such as Dow Corning's Sylgard and RTV which is commercially available from the General Electric Corporation and the Stauffer Company deposited in the free area or gap 15 in aperture 13 defined between the chip 7, inner sheet 2, cover sheet 3 and the other outer or cover sheet 4 which is superimposed on and integrated to inner sheet 2 by adhesives and the like. Use of the potting material 13, also enables use of flexible plastic materials such as polyvinyl chloride in the fabrication of this card. In this manner the resilient potting material will permit flexure of the card so as to accommodate displacement of the chip and prevent breaking of its electrical connection with conductor strips 9. Alternatively, with use of flexible plastic materials in the card, the flexible inner plastic sheet 2 may be provided with a rigid inset sufficiently dimensioned to contain an aperture for receiving the memory chip 7. As will be appreciated, with use of flexible materials, such as thermoplastics for the inner and outer sheets of the cards, integration of the sheets may simply be effected by heating to the necessary temperatures.

Figure 6:
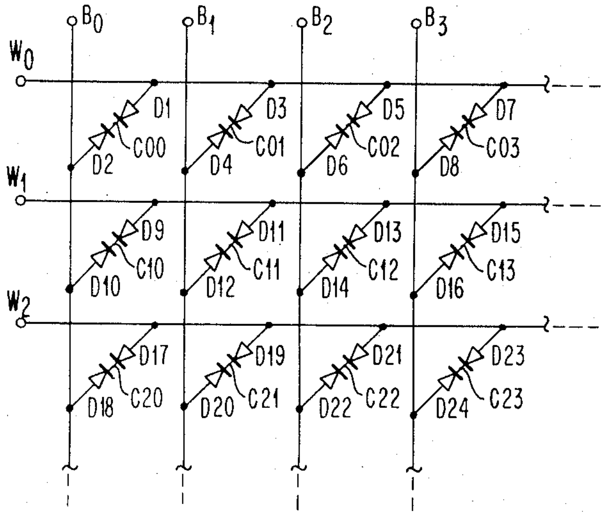
FIG. 6 is a schematic drawing of a specific memory matrix formed in a semiconductor device or chip comprehended for use in the information cards of this invention.

One specific illustrative embodiment of a monolithic memory which may be used in the information cards of this invention is shown in FIG. 6. This particular information storage element is a monolithic write once read only store (ROS) memory having cells which are predictably alterable. These cells as shown, are defined by monolithically formed back-to-back diode pairs which have unequal breakdown voltages with a metal contact directly connected to the region of semiconductor forming the common part of said back-to-back pair of monolithic diodes.

A twelve cell or twelve bit back-to-back diode matrix is illustrated in FIG. 6 for the purpose of illustrating the relationship of a cell to an ROS memory. The matrix comprises four bit lines $B_0$–$B_3$, three work lines $W_0$–$W_2$, and twelve cells, each connected between one bit line and one work line. The cells are identified herein by the lines they are connected to, e.g. the cell containing diodes $D_1$ and $D_2$ is identified as cell $B_0W_0$ or cell, C00.

The back-to-back diodes prevent conduction between the word and bit lines provided the applied voltage is below the reverse breakdown voltage of the reverse biased diodes. Such a reverse biased diode can be shorted by applying a relatively low level current thereto. The phenomenon, called fusing, can be selectively applied to the cells by applying a fusing voltage or current between or to one word line and one bit line. Assuming cell 12 is selected for fusing and the polarity of the applied signal is such that diode D14 is reverse biased, diode D14 will fuse and thus a highly conductive path will be provided between $W_1$ and $B_2$ in the forward direction of non-fused diode D13.

The C12 can now be said to represent one state which is opposite to the state it previously occupied. The two states can be detected in a conventional matrix application by applying a voltage or current to one line connected to the cell and sensing the change in current or voltage in the other line connected to the cell. A matrix of the type described thus has the capability of acting as write once read only store.

Typically this may be seen by assuming that the polarity of the applied currents and voltages are such that the even numbered diodes are the reverse biased diodes and the odd numbered diodes are the forward biased diodes. The shorts across diodes D14 in cell C12 and D24 in cell 23 indicate that cells 12 and C23 have already been "written" into. Assume it is now desired to write into cell C13. As described above this is accomplished by applying the proper electrical quantity between lines $W_1$ and $B_3$ to fuse reverse diode D16. It can be seen that an alternate path between $W_1$ and $B_3$ is: diode 13, line $B_2$, diode D22, line $W_2$ and diode D23. Consequently, the reverse bias voltage applied to diode D21 is the same as that applied to the target diode D16 except for the small forward voltage drops of diodes D13 and D23.

Figure 7:
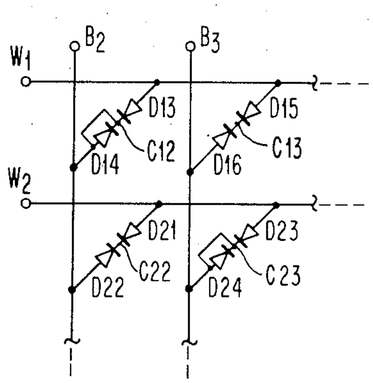
FIG. 7 is a schematic of a portion of the memory of FIG. 6 for illustrating the mode of storing information therein.

Undesired alteration of diode D21 is overcome by making the diodes in the cell so that the diodes to be fused have lower breakdown voltages than those which are not to be fused. For example a seven volt breakdown voltage for the even numbered diodes of FIG. 7 and a 20 volt breakdown voltage for the odd numbered diodes of FIG. 7 insure that in the above described situation, diode D16 alone would be fused. When sufficient power, by current or voltage application, is applied to a selected diode for a sufficient period of time, a metal semiconductor alloy forms substantially at the surface of the semiconductor material, but below the typical oxide covering layer, and connects the metal lands on both sides of the junction thereby shorting the junction. Currents substantially below 200 ma have been used to "fuse" diodes in this manner at times in the millisecond range. This has been done by forcing a current through the reverse diode via a current generator and allowing the voltage to be assumed by the diode. The voltage will go from the breakdown voltage of approximately 7 or 8 volts down to less than one volt in a matter of milliseconds. Visual inspection of photomicrographs of a fused junction show a metallic looking connection extending between the metal lands.

It is believed that the current applied to the diode heats the diode in the area of the junction to the eutectic temperature of the metal-semiconductor causing atomic alloying of the metal and semiconductor.

Figure 8:
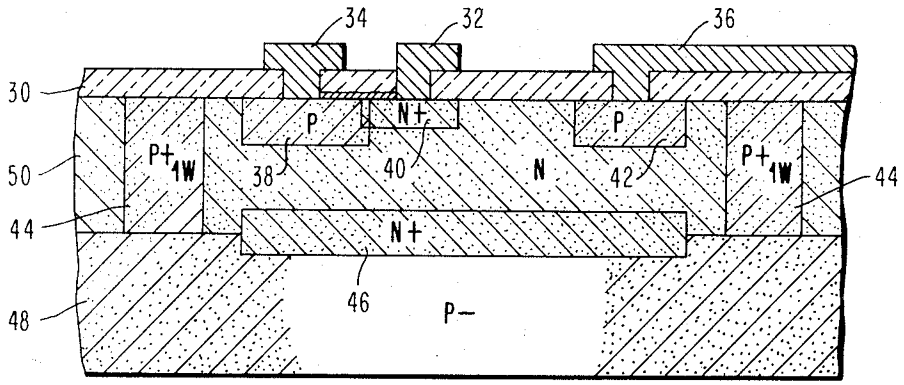
FIG. 8 is an exaggerated view of a cross section of a specific example of a semiconductor cell employed in the memory of FIG. 6 and 7.
Figure 9:
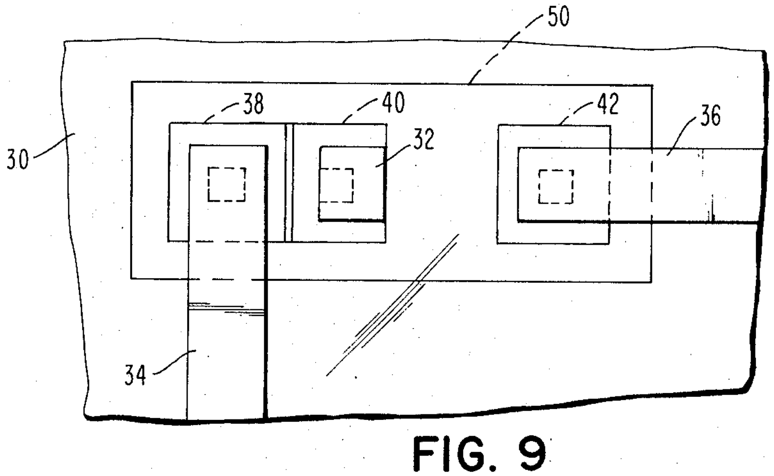
FIGS. 9 and 9A are plain views of the basic structure of FIG. 8.

The incorporation of an alterable cell in a semiconductor chip is illustrated in FIGS. 8 and 9, which show the side and top views respectively of the same cell.

A p-semiconductor substrate 48 has an n+ "subcollector" region 46 therein which is underneath the two diodes of the cell. The subcollector is not required but, as is well known in the art, improves the device characteristics. An n-epitaxial layer 50 is formed on the p-substrate 48, and the cell is electrically isolated (internally) from other elements on the same chip by a surrounding p+ isolation region 44. Two p regions, 38 and 42, formed by diffusion into the epitaxial layer 50, form back-to-back diodes by virtue of the p-n boundaries created. For the purpose of decreasing the reverse breakdown voltage of one of the diodes and n+ region 40 is formed in the epitaxial layer 50 between the two p regions 38 and 42, and touches p region 38. The touching of the n+ region 40 to the p region 38 results in a reverse breakdown voltage at the p-n+ barrier which is substantially less than the reverse breakdown voltage of the p-n barrier formed by either of the p regions 38, 42 and the epitaxial region 50.

The semiconductor material is preferably silicon but others may also be suitable, as will be recognized by those of ordinary skill in the art. An insulating coating 30, such as silicon dioxide covers the surface of the chip and holes are made therethrough for the purpose of allowing metal conductors to contact the semiconductor material at appropriate positions. Metal 34, forming a bit line, contacts the p region 38; metal 36, forming a word line, contacts the p region 42; metal 32 contacts the n-type conductivity region, specifically the n+ region 40. The metal is preferably aluminum but may be other metals such as aluminum-copper or gold. In selecting suitable semiconductor material and metal, other than the standard criteria used in the selection process for making integrated circuits, an additional criteria here appears to be that the eutectic temperature of the metal-semiconductor be below the melting point of either the metal or the semiconductor.

The metal 32 is defined herein as a free metal, free metal contact, or free metal land. The designation "-free" connoting that the metal applied to the N+ region is not connected to other circuit elements in the chip. For example the bit line 34 is to be connected to a group of diodes and to sense amplifiers and other circuits; the word line 36 is to be connected to a group of diodes and to word drive and possibly other circuits. The fusing current/voltage is applied to the bit and word lines. The free metal 32 serves the purpose of providing a terminal for the aluminum-silicon alloy connection formed during the fusing process, and also, presumably, as a supplier of aluminum atoms for formation of the aluminum silicon alloy, In FIG. 9 the p and n+ and n epitaxial regions are delineated by dashed lines. The solid squares on the metal 32, 34, and 36 designate the contact holes through the oxide coating 30 directly under the metal.

In a specific example, the distance between the contact hole metallization for the n+ region 40 and p region 38 is 0.25 mils and the dopant concentration of the conductivity regions are substantially as follows:

| | |
|---|---|
| P diffusion | $10^{19}$ Boron atoms/cc |
| N+ diffusion | $10^{21}$ Phosphorous atoms/cc |
| P+ diffusion | $10^{21}$ Boron atoms/cc |
| N epitaxial | $10^{16}$ Arsenic atoms/cc |
| N+ subcollector | $10^{21}$ Arsenic atoms/cc |

A device having the characteristics described was found to fuse (in this case go from 8 volts to less than 1 volt) in about 1 to 10 milliseconds under an applied current of 100 milliamperes, the current being applied by a constant current generator. An aluminum silicon alloy connector connects metal lands 34 and 32 beneath the oxide coating 30 and shorts the p-n+ junction. It should be noted that the diode is not destroyed in the sense that a p-n or p-n+ junction no longer exists. However, since it is shorted it no longer serves as a barrier for current flow between the word and bit lines.

Figure 9A:
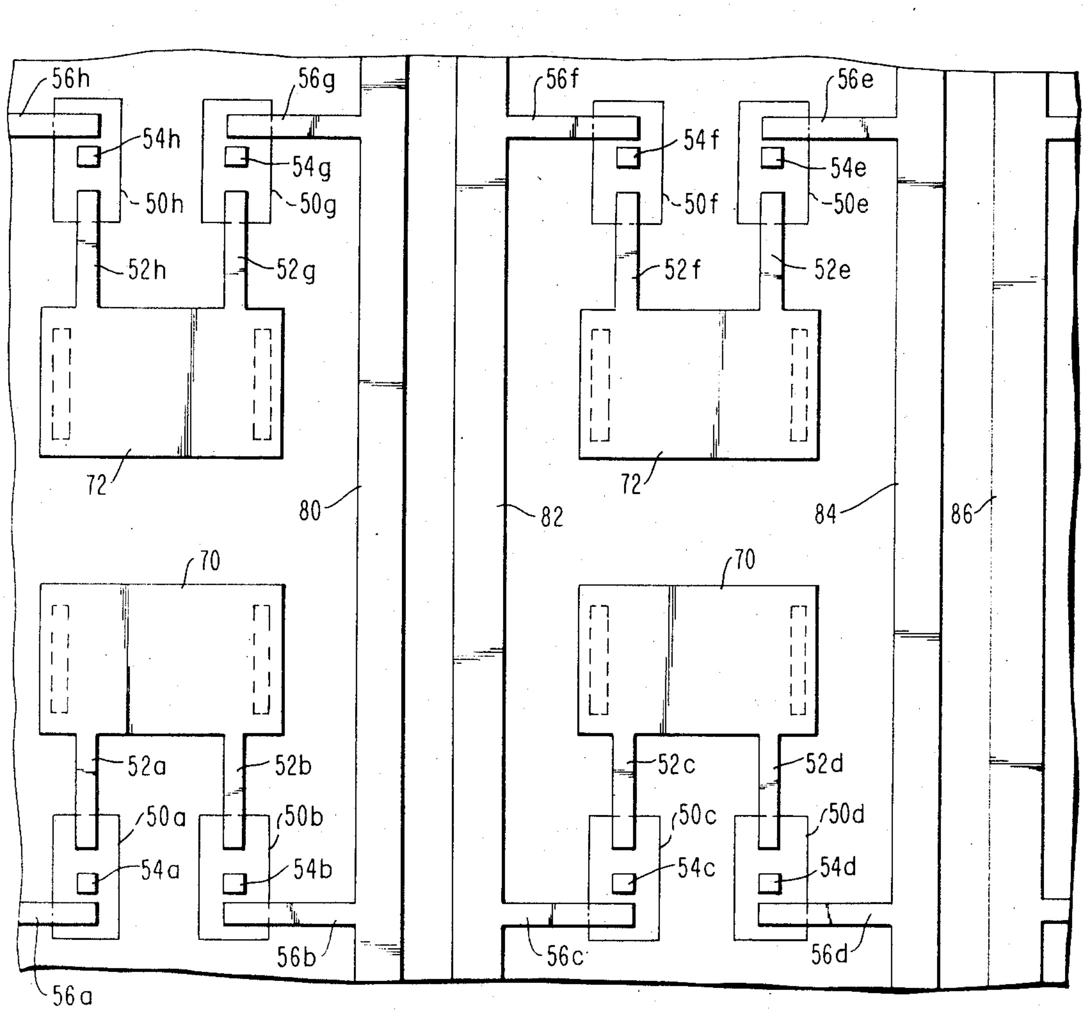

An example of a portion of an integrated monolithic matrix comprising multiple cells and their respective interconnections is illustrated in FIG. 9A. The top view of the illustrated portion of the monolithic matrix shows only eight cells *50a–50g* but it will be apparent that many more cells can be accommodated by the same layout scheme. The cells *50a–50g* are identical to the cell shown in FIGS. 8 and 9. The subscripts a-g are used to represent the identical features of the cells *50a* through *50g* respectively, and thus the description will omit the subscript and describe the cells collectively by the reference numerals alone. The cell 50a comprises metallization connections *52a*, *54a*, and *56a* which are connected respectively to the p,n+ and p regions. The "reverse" diode or fuseable diode is formed by the semiconductor regions to which metallization *54a* and *56a* are connected. The drawing also shows word line or horizontal line metallization 80, 82, 84, 86. Each bit line metallization is connected to a column of cells and each word line metallization is connected to a row of cells. For example bit line 80 is connected to cells *50b* and *50g* (and also to other cells in the same column-not shown) by metallization *56b* and *56g*. Word line 70, for example, is connected to cells *50a*, *50b*, *50c* and *52d*, respectively. An underpass connection interconnects the word line metallization on opposite sides of the bit lines. This allows a single layer of metallization for bit and word lines despite the crossover characteristic of the layout. Underpass interconnections are known in the art and usually comprise a region of semiconductor material doped to be relatively highly conductive. Metallization contacts the doped region at opposite ends thereof.

Figure 10:
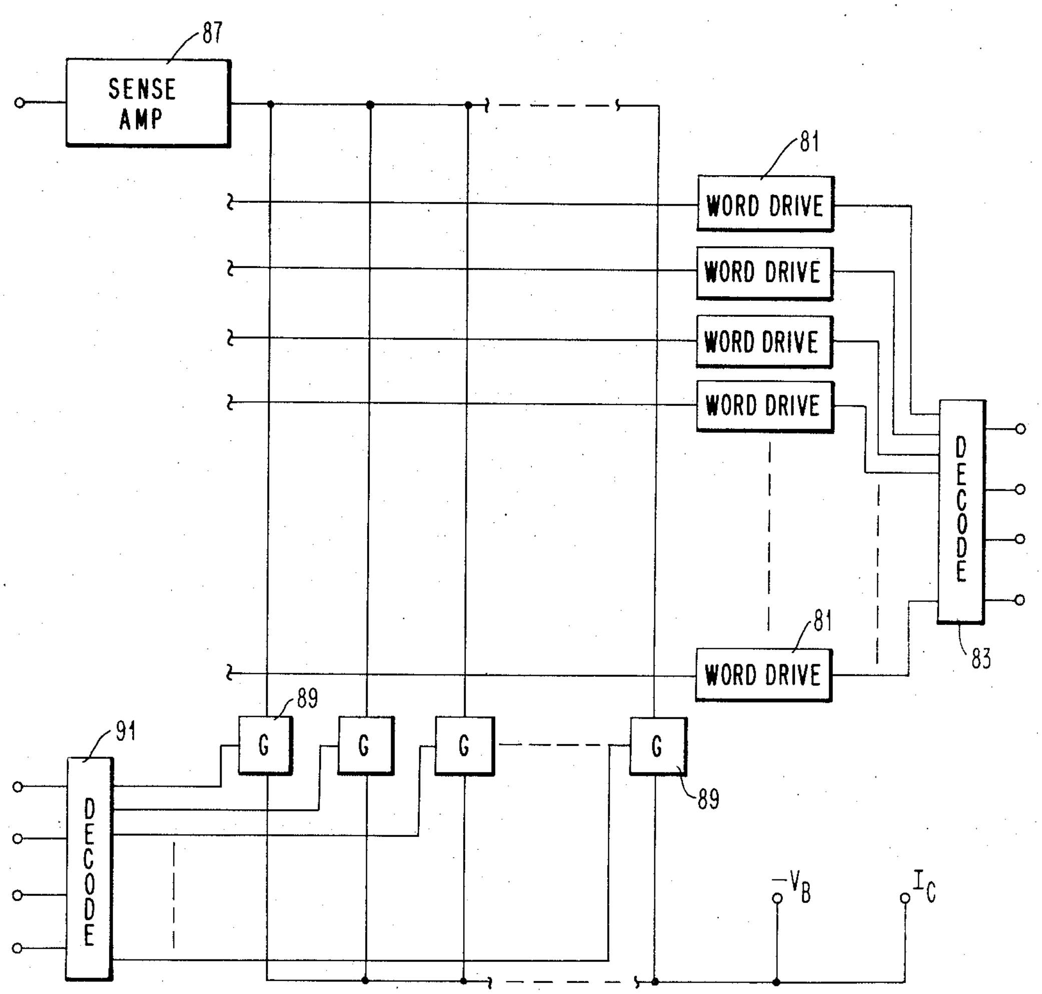
FIG. 10 is a partial schematic and partial block diagram illustrating the use of fuseable cell as part of write once read only memory.

As will be appreciated by any one of ordinary skill in the art, the monolithic or integrated structure will also include driving, sensing and decoding circuits on the same chip. As these types of circuits are well known in the art and further since the specific form of these circuits is not a part of the present invention they will not be illustrated in detail herein. A partial schematic, partial block diagram of the circuit arrangement of the elements formed on a chip is shown in FIG. 10 for a 16 by 16 line matrix.

The matrix comprises 16 word or horizontal lines and 16 bit or vertical lines. A cell connection exists at each word line-bit line cross point, but they are not illustrated in order not to clutter the drawing. Each word line is connected to a word drive circuit 81 which operates when gated on to connect the respective word line to a ground or relatively positive potential. One word line is selected by a four bit binary code which is applied from an external source to the decode device 83. The latter device gates on the word driver connected to the addressed line.

Each of the 16 bit lines in the group is connected to a sense amplifier circuit 87 at one end thereof, and to one of the respective gates 89 at the other end thereof. A particular bit line is selected by an externally applied four bit binary address which is applied to a decode circuit 91. The output of decode circuit 91 gates on the gate 89 which is connected to the addressed bit line thereby connecting the addressed bit line to the terminals-$V_B$ and $I_C$.

In order to fuse the reverse diode at the intersection of bit line *x* and word line *y*, the addresses *x* and *y* are applied respectively to the decode circuits 91 and 83 and a constant current generator which generates 100ma is connected to terminal $I_C$. As illustrated, the positive current flow is in the direction from word line to bit line. The reverse diode fuses thereby providing a non-blocking connection between work line *y* and bit line *x* in one direction.

For read out, a bit and word line are addressed and a relatively low level negative voltage is applied to terminal-$V_B$. The signal sensed by the sense amplifier 86 indicates whether the addressed cell contains a fuse or no-fuse, which can be interpreted as a binary one or zero.

The particular arrangement shown in FIG. 10 is not critical. Other arrangements will readily suggest themselves to those of ordinary skill in the art and it is deemed unnecessary to show further arrangements since the application of the invention to ROS usage is sufficiently clear.

Figure 11:
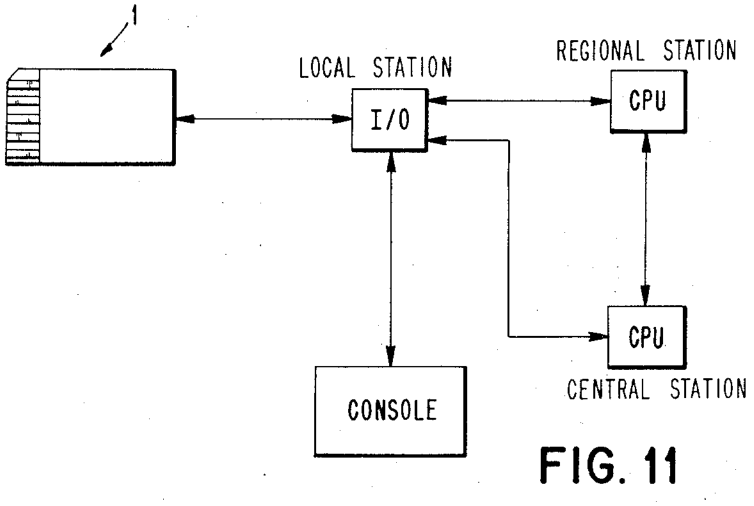
FIG. 11 is a block diagram of a typical system for use of the information card of this invention.

A typical system for utilizing the information cards of this invention is illustrated in FIG. 11. In processing a transaction involving the card, it may be inserted in a socket of a card reader at a local station provided with conventional peripheral equipment which typically includes a console and which usually may also be provided with a display board and a keyboard for entering details of the transaction and activating the necessary computer operations. If desired, an integral computer processing unit may be self-contained at the local station which alternatively on appropriate activation may be tied over transmission lines to a regional and/or a central processing station, the latter two of which may also serve to centralize records. For convenience, the local station may also be tied directly to the central station. In any event, the selected computer unit may perform the necessary operations to process this transaction, and appropriately indicate the results thereof such as the credit limits, transaction limitations, validity of the card, and the like. These results may be shown on the display board, typed out via the keyboard, and employed to update the central records and also the card via the card reader. If everything is in order, the transaction may be completed, with necessary recording thereof within the processing system. Concurrently, the keyboard, or printer if any, at the local station may be activated to print-out a record of the transaction, such as receipts, for the card holder, the establishment and/or the card issuer.

While this invention has been particularly described with reference to the preferred embodiment thereof, it will be understood by those skilled in the art that the foregoing and other changes in form and detail may be made therein without departing from the spirit and scope of the invention.

What is claimed is:

1. An identification device comprising:

A. a card means;

B. an integrated programmable semiconductor memory device disposed within said card in spaced relationship to the peripheral surfaces thereof and comprising a. a plurality of first access terminals, b. a plurality of second access terminals, and c. a plurality of circuit means for connection of a corresponding one of each of said first terminals to each of said second terminals.

C. memory access means extending from a surface of said card to said memory device for selectively activating said circuit means to establish a predetermined connection pattern matrix between selected ones of said first terminals and said second terminals;

a. wherein said access means comprises a plurality of conductors extending within said card from a surface thereof to corresponding first and second terminals of said memory device, b. wherein said circuit means comprises a diode circuit selectively activated to active and inactive states in response to said access means, and c. wherein i. said diode circuit comprises back to back diode pairs connected between each of a corresponding one of said first terminals and each of said second terminals to define open circuits therebetween and with the PN junctions of said diodes capable of permanent destruction for short circuit thereof in response to a reverse breakdown voltage across either of said junction in said diode pairs and wherein ii. said access means is adapted to selectively apply a reverse breakdown voltage across predetermined ones of said diode pairs to establish a unidirectional electrical conductive path therethrough.

* * * * *